US011028938B2

(12) United States Patent
Dreher et al.

(10) Patent No.: US 11,028,938 B2
(45) Date of Patent: Jun. 8, 2021

(54) VALVE ACTUATING SYSTEM

(71) Applicant: Festo SE & Co. KG, Esslingen (DE)

(72) Inventors: Markus Dreher, Stuttgart (DE);
Marcel Heimroth, Denkendorf (DE);
Michael Kanthack, Wimsheim (DE)

(73) Assignee: FESTO SE & CO. KG, Esslingen (DE)

( * ) Notice: Subject to any disclaimer, the term of this patent is extended or adjusted under 35 U.S.C. 154(b) by 189 days.

(21) Appl. No.: 16/067,903

(22) PCT Filed: Dec. 29, 2016

(86) PCT No.: PCT/EP2016/082801
§ 371 (c)(1),
(2) Date: Jul. 3, 2018

(87) PCT Pub. No.: WO2017/121624
PCT Pub. Date: Jul. 20, 2017

(65) Prior Publication Data
US 2020/0263803 A1    Aug. 20, 2020

(30) Foreign Application Priority Data
Jan. 14, 2016   (DE) .......................... 102016200396.8

(51) Int. Cl.
*F16K 31/122*   (2006.01)
*F16K 27/02*   (2006.01)
(Continued)

(52) U.S. Cl.
CPC ...... *F16K 31/1221* (2013.01); *F16K 27/0236* (2013.01); *F16B 21/186* (2013.01)

(58) Field of Classification Search
CPC .... F16K 31/122; F16K 31/1221; F16K 27/02; F16K 27/0236; F16B 21/18; F16B 21/186
See application file for complete search history.

(56) References Cited

U.S. PATENT DOCUMENTS

| 3,453,937 A | 7/1969 | Haberman |
| 4,144,514 A * | 3/1979 | Rinde ....................... H01F 7/13 137/551 |

(Continued)

FOREIGN PATENT DOCUMENTS

| CN | 101479511 A | 7/2009 |
| CN | 201513623 U | 6/2010 |

(Continued)

OTHER PUBLICATIONS

Chinese Search Report dated May 17, 2019.

*Primary Examiner* — Eric Keasel
(74) *Attorney, Agent, or Firm* — Hoffmann & Baron, LLP

(57) ABSTRACT

A valve actuating system including a drive device having an axial extension, and having an actuator with an axial output side provided for coupling to a valve and with an opposing axial rear side, wherein the actuator has an attachment interface on the axial rear side thereof for the attachment of an auxiliary device interacting with the actuator, such as a display module, a control head, a position controller or a stroke-limiting module, wherein the attachment interface has a sectional surface onto which the auxiliary device can be tensioned by means of an axial locking device, wherein the axial locking device has a main body and a collar with a locking edge, with which at least one locking element is in contact on the side facing the actuator in order to tension the auxiliary device on the support surface, wherein the collar is formed by a retaining ring secured on the main body.

9 Claims, 4 Drawing Sheets

(51) Int. Cl.
  *F16K 21/18*     (2006.01)
  *F16B 21/18*     (2006.01)

(56) References Cited

U.S. PATENT DOCUMENTS

| | | |
|---|---|---|
| 4,323,001 A | 4/1982 | Masclet et al. |
| 4,871,143 A | 10/1989 | Baker |
| 2007/0007474 A1 | 1/2007 | Hayashi et al. |
| 2008/0083891 A1 | 4/2008 | Holliday |
| 2013/0193357 A1 | 8/2013 | Larsen |

FOREIGN PATENT DOCUMENTS

| | | |
|---|---|---|
| DE | 9415717 | 9/1994 |
| DE | 10030825 | 6/2001 |
| DE | 102004049512 | 4/2006 |
| DE | 102013018564 | 5/2015 |
| EP | 1463175 | 9/2004 |
| FR | 1346796 | 12/1963 |
| GB | 493471 | 10/1938 |
| WO | WO2007128360 | 11/2007 |
| WO | WO2014075666 | 5/2014 |

\* cited by examiner

VALVE ACTUATING SYSTEM

This application claims priority based on an International Application filed under the Patent Cooperation Treaty, PCT/EP2016/082801, filed Dec. 29, 2016, which claims priority to DE102016200396.8, filed Jan. 14, 2016.

BACKGROUND OF THE INVENTION

The invention relates to a valve actuating system, comprising a drive device having an axial extension, which has an actuator with an axial input side provided for coupling to a valve and with an opposing axial rear side, wherein the actuator has an attachment interface on its axial rear side for the attachment of an auxiliary device interacting with the actuator, such as, for example, a display module, a control head, a position controller or a stroke-limiting module, wherein the attachment interface has a sectional surface, onto which the auxiliary device can be tensioned by means of an axial locking device, wherein the axial locking device has a main body and a collar with a locking edge, with which at least one locking element is in contact on the side facing the actuator in order to tension the auxiliary device on the sectional surface.

A valve actuating system of this type known from EP 1 463 175 B1 has an elongated drive device, which is mounted with an axial output side in front on a valve designed, in particular, as a process valve. The valve, frequently also referred to as a valve fitting, contains a valve member, which can be positioned with the help of the drive device in different operating positions, in order to control a fluid flow. For the actuation of the valve member the drive device contains a pneumatic actuator, which in its axial rear side facing away from the valve has a uniform attachment interface, which makes possible optionally connecting different designs of control modules. The attachment interface has a connecting piece for the connection of an auxiliary device, for example, of a pneumatic control module.

When securing the auxiliary device, therefore, for example, the control module, to the attachment interface, it is known from a prior art untraceable in printed documents to use an axial locking device, which has a main body and a collar with a locking edge. A locking element, in particular, in the form of a fastening screw comes into contact with the locking edge of the collar. Thus, the auxiliary device is tensioned on the support surface of the attachment interface. It is disadvantageous that the locking element engages with the locking edge of the collar, so that there, as a result of the contact of the locking element with the locking edge, wear occurs or even damages to the locking edge can occur, in particular, if the collar and the locking edge consist of softer material than that of the locking element.

A further disadvantage is that the connection between the at least one locking element and the locking edge is not stable and can loosen, in particular, if the locking edge consists of softer material than that of the locking element. The attached auxiliary device is in this case no longer securely held on the attachment interface.

The problem addressed by the invention is therefore to create a valve actuating system of the type mentioned at the outset, in which the wear and the risk of damages to the locking edge of the collar of the axial locking device is minimised.

SUMMARY OF THE INVENTION

This problem is solved by a valve actuating system with the features of the independent Claim 1. Further developments of the invention are described in the dependent claims.

The valve actuating system according to the present invention is characterised in that the collar is formed by a retaining ring secured on the main body.

A direct contact of the at least one locking element, for example, a fastening screw, and the main body is thus prevented, since the retaining ring is arranged in the direction radially inwards upstream of the main body. The locking element is therefore supported on the retaining ring and not on the main body. The retaining ring protects the main body against wear and damages. Since the retaining ring is a mass component, it can be replaced easily and rapidly, if wear occurs to it itself in particular by the addition of the locking element.

In a particularly preferred manner, the retaining ring consists of harder material than the material of the retaining ring, for example, spring steel. The attachment or the connection between the locking element and the locking edge of the retaining ring consisting of hard material also remains stable over long periods of time, that is, does not loosen. Even after repeated detaching and subsequent attaching of the at least one locking element the connection is of consistently good stability. This makes it possible to use relatively soft material as material of the main body of the axial locking device, for example, aluminium material, in particular, aluminium die-cast.

In a particularly preferred manner, the retaining ring is designed as a snap ring. Since such a snap ring is spit, therefore, has a gap oriented in the radial direction, it can be easily secured on the main body of the axial locking device by expanding the gap.

In a further development of the invention the snap ring is designed as a round wire snap ring, wherein the locking edge is formed from a section of the lateral surface of the round wire snap ring formed convexly to the locking element.

Alternatively it is possible, that the snap ring is designed disc-like and the locking edge is formed from a conical section of the lateral surface of the snap ring tapering in the direction of the support surface.

It is possible, that the retaining ring, in particular, a snap ring, is received in a circumferential annular groove formed on the main body.

In a particularly preferred manner, the main body of the axial locking device is designed as, in particular, a cylindrical connecting piece positioned, in particular, in the central area of the attachment interface. The retaining ring is secured in this case on the lateral surface or on the outer circumference of the connecting piece, for example, in the circumferential annular groove.

The actuator advantageously has a housing referred to as an actuator housing, in which an output member drivable to an output movement is arranged, which in the state of the drive device attached to a valve interacts with a valve member of the valve in a driving manner. Preferably, the actuator is a fluid-actuated actuator, in particular, a pneumatic drive.

In a particularly preferred manner, the valve actuating system comprises at least one auxiliary device attached to the attachment interface which is tensioned on the support surface by means of the axial locking device, which auxiliary device is advantageously a display module and/or a position indicator and/or a control head and/or a position controller and/or a stroke-limiting module. If the auxiliary device is designed as a control head or as a position controller, with its help the output movement of the output member and/or the respectively assumed operating position of the output member can be controlled and/or regulated. An auxiliary device designed as a display module permits a visual monitoring of the position of the output member and has, for example, a transparent area, through which the position of a display element motion-coupled with the output member can be seen.

BRIEF DESCRIPTION OF THE DRAWINGS

Preferred embodiments of the invention are depicted in the drawing and are elucidated in detail below. In the drawing

DETAILED DESCRIPTION OF THE PREFERRED EMBODIMENTS

Figure 1:
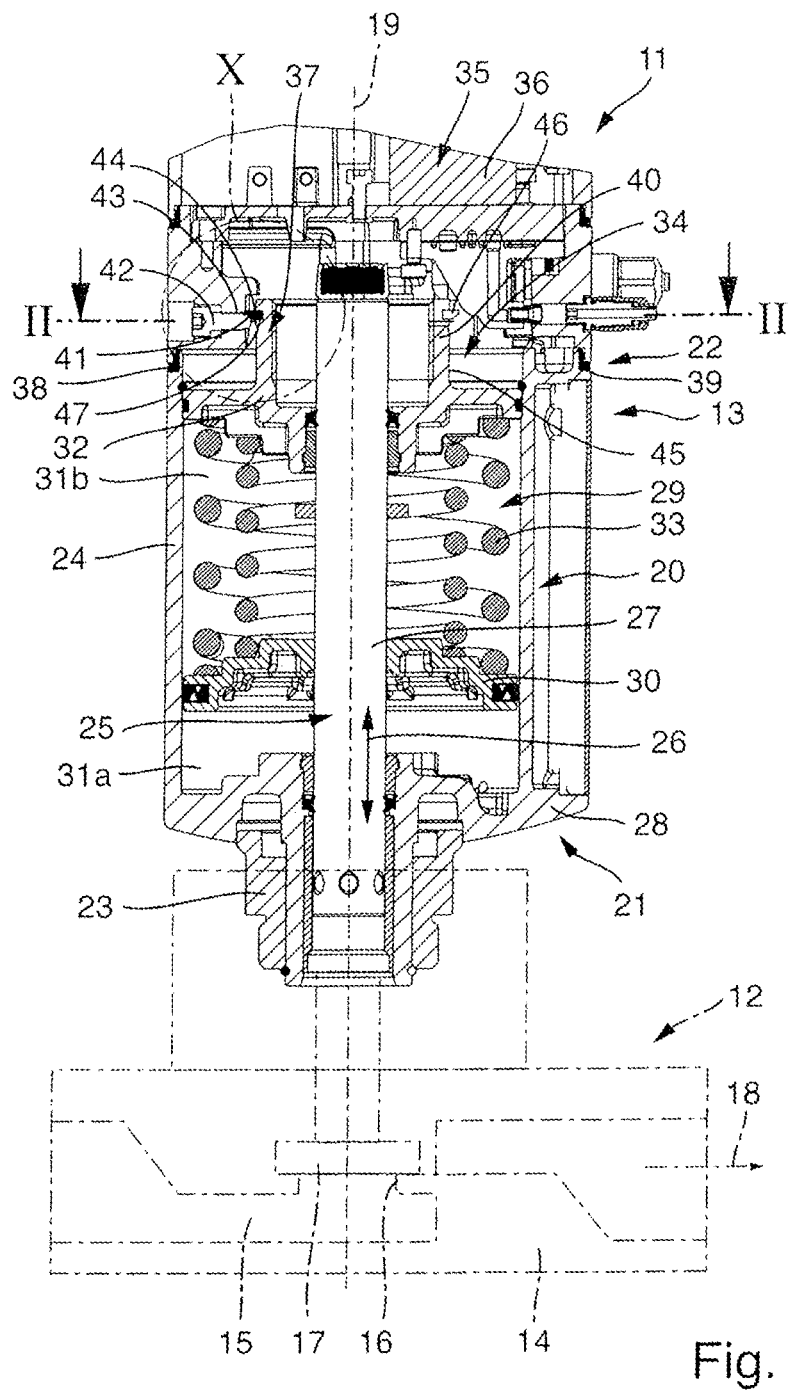
FIG. 1 shows a first embodiment of the valve actuating system according to the present invention in a longitudinal section, wherein an auxiliary device mounted on an actuator is indicated in the partial longitudinal section and a valve which is part of the valve actuating system is indicated only with dot-dash lines.
Figure 2:
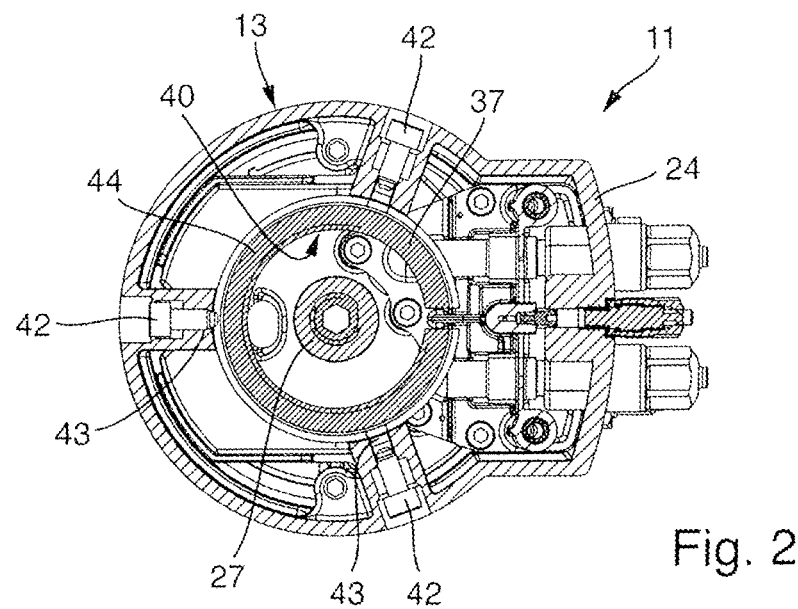
FIG. 2 shows a cross section through the valve actuating system in the area of the attachment interface along the line II-II from FIG. 1.
Figure 3:
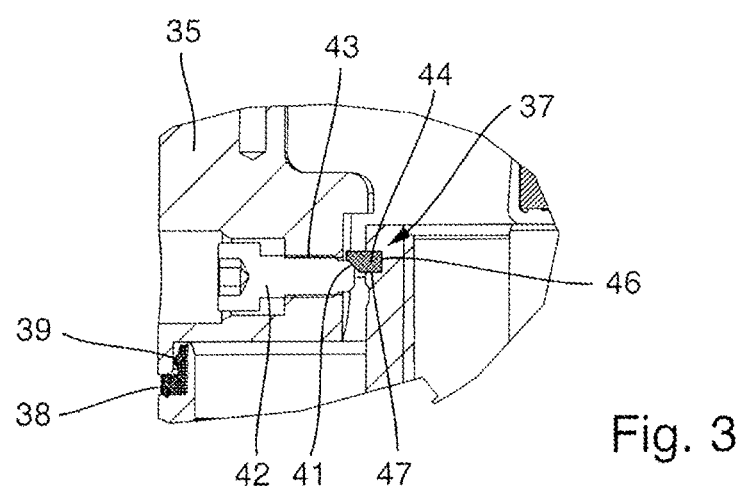
FIG. 3 shows an enlarged depiction of the detail X from FIG. 1.

FIGS. 1 to 3 show a first embodiment of the valve actuating system according to the present invention denoted in its entirety by the reference number 11.

The valve actuating system 11 contains a drive device 13 serving for actuating a valve 12 indicated only schematically, usable for controlling a fluid flow, wherein the valve 12 is advantageously also a component of the valve actuating system 11.

The valve 12 has a valve housing 14, through which a fluid channel 15 passes, in the course of which there is an overflow opening 16, to which a valve member 17 is assigned. The valve member 17 is movable linearly and can optionally be positioned in a closed position closing the overflow opening 16 or in at least one open position freeing the overflow opening 16. In the open position of the valve member 17 a fluid can flow through the fluid channel 15 in accordance with arrows 18. The flow rate depends on the currently enabled flow cross section of the overflow opening 16. The valve member 17 or shut-off member is shown in the example shown as a shut-off piston arranged at the end of a spindle, provided with a seal. It is of course possible, that the valve member can also be alternatively designed in a different manner. For example, a valve member in the form of a diaphragm can be used, which can close the overflow opening by means of a pressure piece coupled to the spindle. In other words, the valve can also be designed as a diaphragm valve.

The drive device 13 has a longitudinal extension and accordingly an imaginary longitudinal axis 19. An actuator 20 is part of the drive device 13, which actuator has the same longitudinal axis 19 as the drive device 13. The actuator 20 has an axial output side 21 pointing downwards in the drawing and an axially opposite axial rear side 22 pointing upwards in the drawing. On the axial output side 21 the actuator is equipped with a coupling device 23, with the help of which it can be secured or is secured on the valve 12, specifically, in particular, in a detachable manner.

The actuator 20 has an actuator housing 24, which with the help of the coupling device 23 can be attached or is attached preferably detachably to the valve housing 14. Accordingly, the actuator housing 24 and the valve housing 14 form a uniform assembly in the operation of the valve actuating system 11.

In the interior of the actuator housing 24 an output member 25 of the actuator 20 extends, which can be driven by appropriate actuation to a reciprocating output movement 26, indicated by a double arrow, which is a linear motion coincident with the axial direction of the longitudinal axis 19. The output member 25 interacts with the valve member 17 in a driving manner and is advantageously axially motion-coupled with the valve member 17, the latter, in particular, in the area of the coupling device 23.

Exemplarily the output member 25 contains an output rod 27 axially motion-coupled with the valve member 17 designed as a shut-off piston or as a diaphragm, in particular with the spindle of the valve member 17, which output rod passes in a slidable manner through a front closing wall 28 of the actuator housing 24 assigned to the axial output side 21 and which is connected in a housing interior 29 of the actuator housing 24 with a drive piston 30, which is mounted in a slidable manner in the housing interior 29 with sealing.

The drive piston 30 divides the housing interior 29 into a front housing chamber 31a facing the front closing wall 28 and an axially opposite rear housing chamber 31b limited in the area of the axial rear side 22 by a rear closing wall 32 of the actuator housing 24.

The output member 25 can be subjected to an actuating force in order to produce the output movement 26. The type of actuating force depends on the design of the actuator 20, wherein it can be generated entirely electromechanically. However, it is advantageous if the actuator 20 is a fluid-actuated and, in particular, a pneumatic actuator 20, which applies to the embodiment, so that the actuating force results from a fluid pressurisation of the drive piston 30.

The fluid-actuated actuator 20 can be of a single-acting or of a double-acting design. Exemplarily, a single-acting design exists, wherein a spring device 33 arranged in the rear housing chamber 31b constantly acts on the output member 25 in the direction of the front closing wall 28, whereby the valve member 17 is constantly acted upon in the closing direction. Thus, an advantageously "normally closed" constellation exists. Via a first fluid control channel (not depicted) passing through the wall of the actuator housing 24, which fluid control channel opens into the front housing chamber 31a, the front housing chamber 31a can be subjected to a fluid pressure medium, in order to move the output member 25 in the direction towards the rear closing wall 32 and thereby at the same time to bring the valve member 17 into an open position.

The actuator 20 is equipped externally on its axial rear side 22 with an attachment interface 34, on which an auxiliary device 35 necessary or useful for the operation of the valve actuating system 11 can be attached, in particular, in a detachable manner. This auxiliary device 35 is shown in FIG. 1 only in a partial view, which in the example shown is an auxiliary device 35 designed as a control head.

The attachment interface 34 in any event makes possible the alternative attachment of different types of auxiliary devices 35, wherein it depends, in particular, on the application of the valve actuating system 11 and/or on the user preference, what kind of auxiliary device 35 is mounted on the attachment interface 34. In any event, even auxiliary devices 35 designed differently than a control head can be attached to the attachment interface 34.

The control head shown exemplarily in FIG. 1 advantageously receives an electrically actuatable control valve device 36, with which over the first fluid control channel a controlled fluid pressurisation of the front housing chamber 31a can be produced, in order to trigger the output motion 26.

The actuator 20 is equipped in the area of its attachment interface 34 with a securing device in the form of an axial locking device 37.

The attachment interface 34 also has at least one and preferably an axially oriented support surface 38 on the actuator 20, on which the secured auxiliary device 35, therefore in the case at issue the control head, is attached and is axially braced with the support surface 38.

The support surface 38 is located externally on the axial rear side 22 and points axially away from the actuator 20. The attached auxiliary device 35, therefore, for example, the control head, advantageously has a counter-support surface 39, with which it is supported on the support surface 38 in the state mounted on the actuator 20.

The axial locking device 37 has a main body 40, which is designed in the case at issue as a cylindrical connecting piece, which is positioned in the central area of the attachment interface 34. Furthermore, the axial locking device 37 has a collar with an annular locking edge 41 which can engage behind, in particular, radially from the outside. The auxiliary device 35 attached to the support surface 38 contains at least one advantageously several movable locking elements 42, which are supported on the auxiliary device 35 and are adjustable in this connection, so that they press against the locking edge 41 radially from outside. This process brings about, on the one hand, a positive-locking rear grip and, on the other hand, ensures that an axial clamping force is produced, with which the auxiliary device 35 is pressed firmly with its counter-support surface 39 onto the support surface 38 on the actuator 20.

The locking elements 42 are, in particular, screws, which are screwed into threaded holes 43 of the auxiliary device 35 oriented radially in respect to the longitudinal axis 19 and are braced with sloping locking edge 41. Preferably, several locking elements 42 or screws are available in preferably a uniform distribution around the longitudinal axis 19.

As depicted, in particular, in FIG. 3, the collar of the axial locking device 37 is formed by a retaining ring 44 secured on the main body 40.

The retaining ring 44 is designed according to the first embodiment as a snap ring and consists of a harder material than the material of the main body 40.

According to the first embodiment the snap ring is designed disc-like and is received in a circumferential annular groove 46 on the main body 40 in the area of its end face on the outer surface or lateral surface 45 and held there. The disc-like snap ring consists advantageously of steel material, for example, spring steel, which as a rule is significantly harder than the material of the main body 40, which can be softer steel material, or also aluminium material, for example, aluminium die-cast.

As also shown in FIG. 3, the locking edge 41, which has an annular design, is formed from a conical section 47 of the lateral surface of the snap ring tapering in the direction of the support surface.

As shown, in particular, in FIG. 3, the locking elements, in particular, the screws with their screw shafts engage from radially outside the locking edge 41, therefore are screwed against the locking edge 41. Therefore, the retaining ring 44, in particular, the snap ring, protects the main body 40 and its soft material against damages due to a screw engagement of the screws. The main body 40 is therefore protected against wear, which may occur to the retaining ring 44, however, is minimised in that the retaining ring 44, in particular, the snap ring, consists of relatively hard material, therefore, for example, spring steel. Furthermore, the combination of locking element, in particular, screws and retaining ring, in particular, snap ring, makes possible a reliable connection, which is not readily loosened, such as could occur, for example, when locking elements directly make contact with the main body 40. Thus, the bracing of auxiliary device 35 and actuator 20 in the area of the attachment interface 34 is also maintained over long periods of time with substantially constant clamping force. Also, the repeated loosening and tightening of the locking elements, in particular, screws, does not lead to a change of the clamping force.

Figure 4:
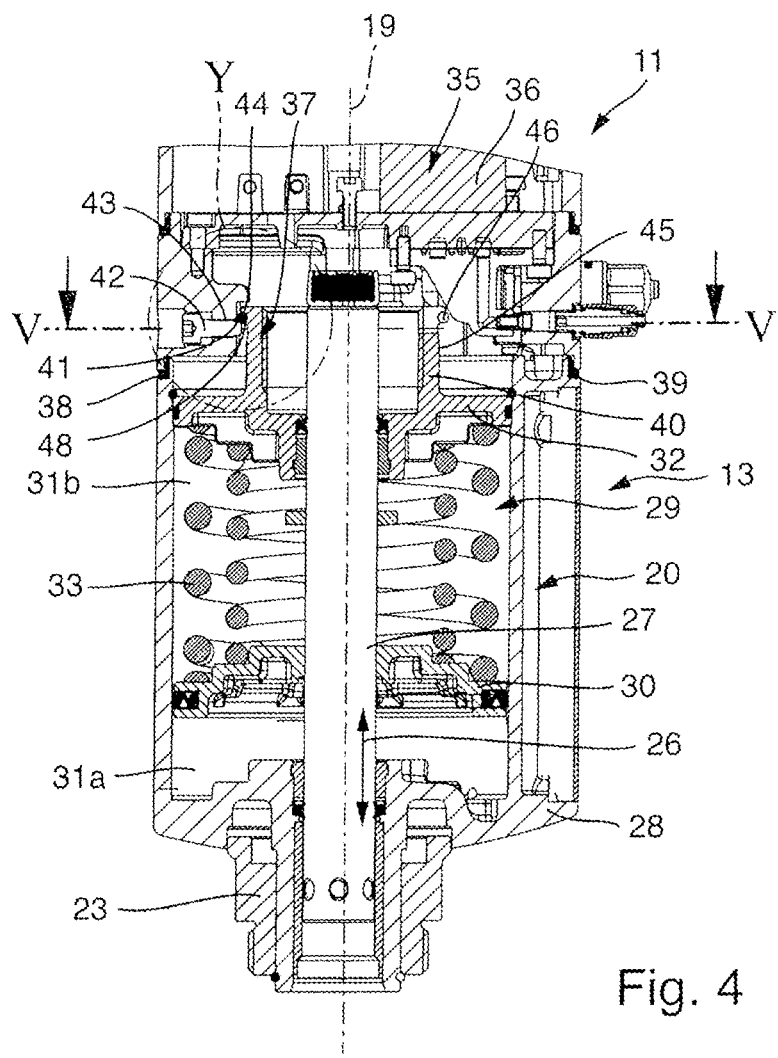
FIG. 4 shows a second embodiment of the valve actuating system according to the present invention in a longitudinal section, wherein an auxiliary device mounted on an actuator is depicted in a partial longitudinal section.
Figure 5:
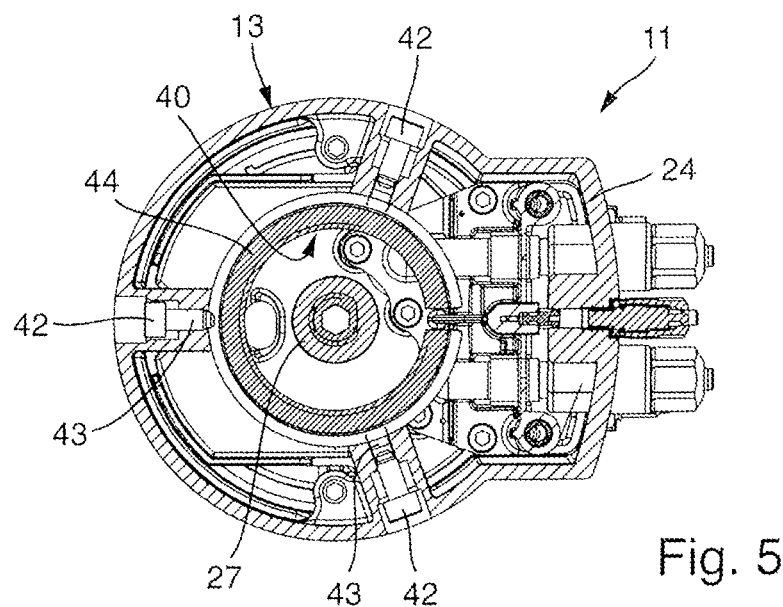
FIG. 5 shows a cross section through the valve actuating system from FIG. 4 in the area of the attachment interface along the line V-V from FIG. 4
Figure 6:
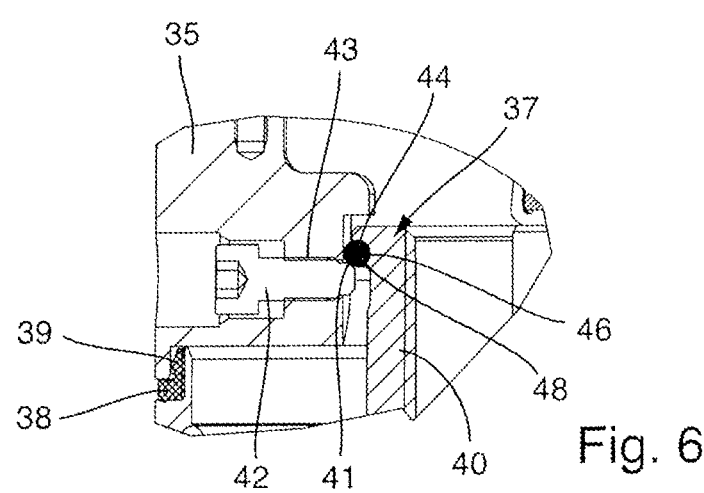
FIG. 6 shows an enlarged depiction of the detail Y of the valve actuating system from FIG. 4.

FIGS. 4 to 6 show a second embodiment of the valve actuating system 11 according to the present invention. The second embodiment differs from the previously described first embodiment by a different design of the retaining ring 44. In contrast to the retaining ring 44 in the form of a disc-like snap ring shown in FIGS. 1 to 3, according to the second embodiment a snap ring in the form of a round wire snap spring is used. This round wire snap ring is also received in a circumferential annular groove 46 on the lateral surface 45 of the connecting piece.

In contrast to the previously described first embodiment the locking edge 41 in the second embodiment is, however, designed differently and is formed by a section 48 of the lateral surface of the round wire snap ring formed convexly to the locking element 42. The round wire snap ring also consists of a harder material than the material of the main body 40, such as, for example, steel material, in particular, spring steel. The advantages previously described in connection with the first embodiment (less wear, reliable connection) are also realised in the second embodiment.

The invention claimed is:

1. A valve actuating system comprising a drive device and an auxiliary device, the drive device having an axial extension and an actuator with an axial output side provided for coupling to a valve and with an opposing axial rear side, wherein the actuator has an attachment interface on its axial rear side for the attachment of the auxiliary device interacting with the actuator, wherein the attachment interface has a support surface, onto which the auxiliary device can be tensioned by means of an axial locking device, wherein the axial locking device has a main body and a collar with a locking edge, with which at least one locking element is in contact on the side facing the actuator in order to tension the auxiliary device on the support surface and wherein the collar is formed by a retaining ring secured on the main body,
   wherein the retaining ring consists of harder material than the material of the main body.

2. The valve actuating system according to claim 1, wherein the main body is designed as a connecting piece positioned in the central area of the attachment interface.

3. The valve actuating system according to claim 1, wherein the actuator has an actuator housing, in which an output member drivable to the output movement is arranged.

4. The valve actuating system according to claim 1, wherein the actuator is a fluid-actuated actuator.

5. The valve actuating system according to claim 1, wherein the auxiliary device attached to the attachment interface, tensioned by means of the axial locking device onto the support surface, comprises a display module and/or a position indicator and/or a control head and/or a position controller and/or a stroke-limiting module.

6. A valve actuating system comprising a drive device and an auxiliary device, the drive device having an axial extension and an actuator with an axial output side provided for coupling to a valve and with an opposing axial rear side, wherein the actuator has an attachment interface on its axial rear side for the attachment of the auxiliary device interacting with the actuator, wherein the attachment interface has a support surface, onto which the auxiliary device can be tensioned by means of an axial locking device, wherein the axial locking device has a main body and a collar with a locking edge, with which at least one locking element is in contact on the side facing the actuator in order to tension the auxiliary device on the support surface and wherein the collar is formed by a retaining ring secured on the main body, wherein the retaining ring is received in a circumferential annular groove formed on the main body.

7. A valve actuating system comprising a drive device and an auxiliary device, the drive device having an axial extension and an actuator with an axial output side provided for coupling to a valve and with an opposing axial rear side, wherein the actuator has an attachment interface on its axial rear side for the attachment of the auxiliary device interacting with the actuator, wherein the attachment interface has a support surface, onto which the auxiliary device can be tensioned by means of an axial locking device, wherein the axial locking device has a main body and a collar with a locking edge, with which at least one locking element is in contact on the side facing the actuator in order to tension the auxiliary device on the support surface and wherein the collar is formed by a retaining ring secured on the main body, wherein the retaining ring is designed as a snap ring.

8. The valve actuating system according to claim 7, wherein the snap ring is designed as a round wire snap ring and the locking edge is formed from a section of the lateral surface of the round wire snap ring formed convexly to the locking element.

9. The valve actuating system according to claim 7, wherein the snap ring has a shape of a disc and the locking edge is formed from a conical section of the lateral surface of the snap ring tapering in the direction of the support surface.

* * * * *